(12) United States Patent
Lumassi et al.

(10) Patent No.: US 12,297,990 B2
(45) Date of Patent: May 13, 2025

(54) LIGHT FIXTURE

(71) Applicant: CLAY PAKY S.R.L., Seriate (IT)

(72) Inventors: Alessandro Lumassi, Seriate (IT); Aris Quadri, Seriate (IT)

(73) Assignee: CLAY PAKY S.R.L., Seriate (IT)

( * ) Notice: Subject to any disclaimer, the term of this patent is extended or adjusted under 35 U.S.C. 154(b) by 0 days.

(21) Appl. No.: 18/640,162

(22) Filed: Apr. 19, 2024

(65) Prior Publication Data

US 2024/0353091 A1    Oct. 24, 2024

(30) Foreign Application Priority Data

Apr. 24, 2023   (IT) .......................... 102023000008040

(51) Int. Cl.
*F21V 29/67*   (2015.01)
*F21V 21/30*   (2006.01)

(52) U.S. Cl.
CPC ............ *F21V 29/677* (2015.01); *F21V 21/30* (2013.01)

(58) Field of Classification Search
CPC ...................................................... F21V 21/30
See application file for complete search history.

(56) References Cited

U.S. PATENT DOCUMENTS 6,352,358 B1      3/2002  Lieberman et al.
2011/0159549 A1*  6/2011  Oldham .................... F21K 9/64
                                              315/118

FOREIGN PATENT DOCUMENTS

EP    2982906 A1     2/2016
WO    2015106024 A1  7/2015
WO    2016193674 A1  12/2016

OTHER PUBLICATIONS

Italian Search Report in IT Application No. 202300008040 mailed Oct. 18, 2023, an English Translation attached hereto (6 pages).

* cited by examiner

*Primary Examiner* — Jason M Han
(74) *Attorney, Agent, or Firm* — Leason Ellis LLP

(57) ABSTRACT

A light fixture includes a head housing a source assembly configured to emit a light beam and a support assembly configured to support the head. The light fixture further includes a temperature control assembly configured to control the temperature inside the head and/or the support assembly. The temperature control assembly includes at least one temperature control device; at least one first temperature sensor; and at least one first temperature control module housed in the head and/or in the support assembly and regulated by the temperature control device on the basis of data coming from the at least one first temperature sensor. The at least one first temperature control module is provided with a heating element and a ventilating element which are independently controllable by the temperature control device.

9 Claims, 2 Drawing Sheets

LIGHT FIXTURE

CROSS-REFERENCE TO RELATED APPLICATIONS

This patent application claims priority from Italian patent application no. 102023000008040 filed on Apr. 24, 2023, the entire disclosure of which is incorporated herein by reference.

TECHNICAL FIELD

The present invention concerns a light fixture.

In particular, the present invention concerns a light fixture configured to generate one or more light beams in scenic contexts (for example to light stages) and/or in architectural contexts (for example to light skyscrapers or monuments).

BACKGROUND

Light fixtures of this type are normally provided with ventilation systems dedicated to temperature control. Said systems, however, are dedicated only to removal of the excess heat generated by the light sources used or by the components (electronic and/or mechanical) inside the light fixture.

The use of light fixtures in outdoor environments exposes the light fixtures not only to thermal stress due to high temperatures (up to +45° C.), but also to thermal stress due to excessively low temperatures (down to −40° C.), which can compromise the correct operation of some components (mechanical and/or electronic) of the light fixture or cause condensation inside the light fixture which can affect the functionality of the optical elements.

SUMMARY

An object of the present invention is therefore to provide a light fixture which is simple and inexpensive to produce and which is reliable in any external thermal condition.

In accordance with said objects the present invention concerns a light fixture comprising:
  a head housing a source assembly configured to emit a light beam;
  a support assembly configured to support the head;
  a temperature control assembly configured to control the temperature inside the head and/or of the support assembly; the temperature control assembly comprising:
  at least one temperature control device;
  at least one first temperature sensor; and
  at least one first temperature control module housed in the head and/or in the support assembly and regulated by the temperature control device on the basis of the data coming from the at least one first temperature sensor; the at least one first temperature control module being provided with a heating element and a ventilating element which are independently controllable by the temperature control device.

BRIEF DESCRIPTION OF THE DRAWINGS

Further characteristics and advantages of the present invention will appear clear from the following description of a non-limiting embodiment example thereof, with reference to the figures of the attached drawings, in which.

DESCRIPTION OF EMBODIMENTS

Figure 1:
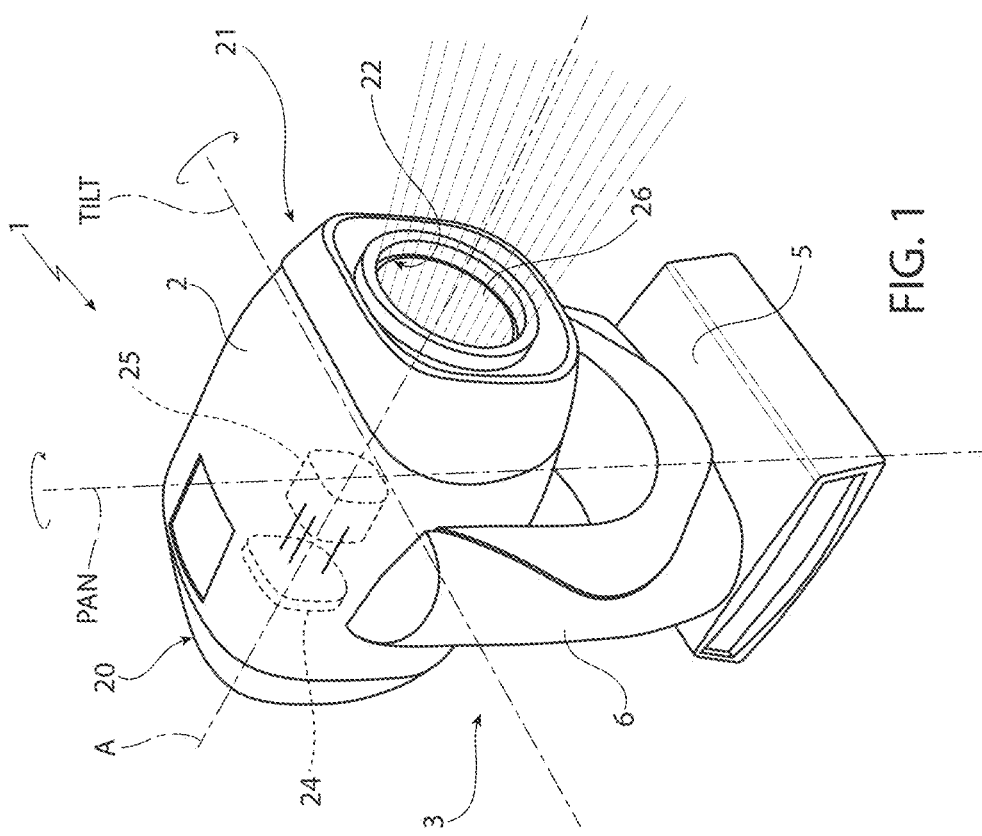
FIG. 1 is a perspective schematic view, with parts removed for clarity and internal parts shown by broken lines, of a light fixture according to the present invention.

In FIG. 1 the reference number 1 indicates a light fixture comprising a casing 2, which here and below will be generically referred to as head 2, and a support assembly 3 configured to support the head 2.

The support assembly 3 is configured so as to allow the head 2 to rotate about two orthogonal axes, commonly defined PAN and TILT. Therefore, in the non-limiting example described and illustrated here, the head 2 is a movable head.

In particular, the support assembly 3 comprises a base 5 and a yoke 6.

The yoke 6 is coupled to the base 5 in such a manner as to rotate about the axis PAN and is provided with two arms 7 and a bridge portion 8 that connects the two arms 7.

The yoke 6 supports the head 2 in a rotating manner about the axis TILT. In particular, the arms 7 of the yoke 6 are coupled to the head 2.

Figure 3:
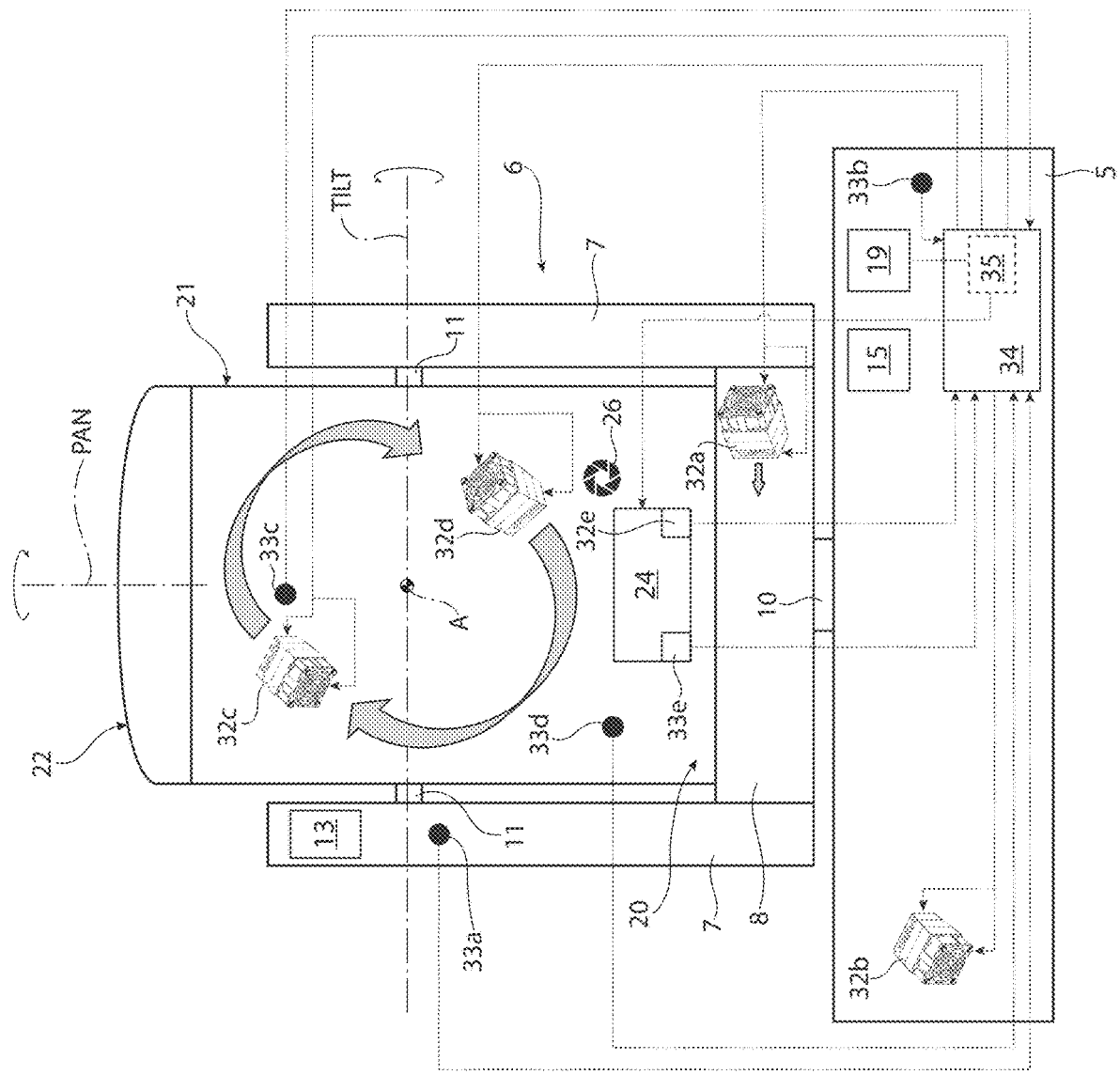
FIG. 3 is a planar schematic view, with parts removed for clarity and parts shown schematically, of the light fixture according to the present invention.

With reference to the schematic representation of FIG. 3, the rotation of the yoke 6 about the axis PAN occurs by means of a pin 10 (in this example vertical), which is integral with the yoke 6 and extends from the bridge portion 8 of the yoke 6 until it penetrates the base 5.

The rotation of the head 2 around the axis TILT occurs by means of pins 11 arranged on opposite sides of the head 2 and aligned along the axis TILT (in this example horizontal). The pins 11 are integral with the head 2 and penetrate into the respective arms 7 of the yoke 6.

To generate the rotations described above, a first motor 13 is provided (schematically shown in FIG. 3) housed in one of the arms 7 of the yoke 6 and configured to move one of the pins 11 and a second motor 15 (also schematically shown in FIG. 3), housed in the base 5 and configured to move the pin 10.

Operation of the motors 15 and 13 is regulated by a control device, which comprises at least one electronic control module 19 housed in the base 5 (schematically shown in FIG. 3).

The control device can comprise further control electronics housed in the head 2 and/or in the yoke 6 and is preferably remote-controlled by means of communications with DMX protocol.

With reference to FIG. 1 and FIG. 3, the head 2 extends along a longitudinal axis A. In FIG. 1 the axis A is arranged crosswise to the axis PAN, while in FIG. 3 the head 2 is in a different position from the one illustrated in FIG. 1 and the axis A is arranged parallel to the axis PAN.

The head 2 has a closed end 20 and an open end 21, which is arranged opposite the closed end 20 along the axis A and is provided with at least one projection opening 22 (which can be seen more clearly in FIG. 1). In the non-limiting example described and illustrated here, the projection opening 22 has a substantially circular section.

Inside the head 2 at least one source assembly 24 is housed (schematically shown in FIG. 3) configured to generate at least one light beam and at least one beam processing element 25 arranged so as to intercept the light beam generated by the source assembly 24. A final optical element 26 (preferably a lens) is housed in the projection opening 22.

The light fixture 1 according to the present invention also comprises a temperature control assembly, which preferably comprises a plurality of temperature control modules 32, a plurality of temperature sensors 33 and a temperature control device 34.

Preferably, the temperature control assembly also comprises a fan 26 configured to move the air inside the head 2.

The fan 26 is preferably arranged at the closed end 20 of the head 2 near the source assembly 24.

The temperature control modules 32 are distributed in the light fixture 1 and in particular are housed in the base 5 and/or in the yoke 6 and/or in the head 2.

Figure 2:
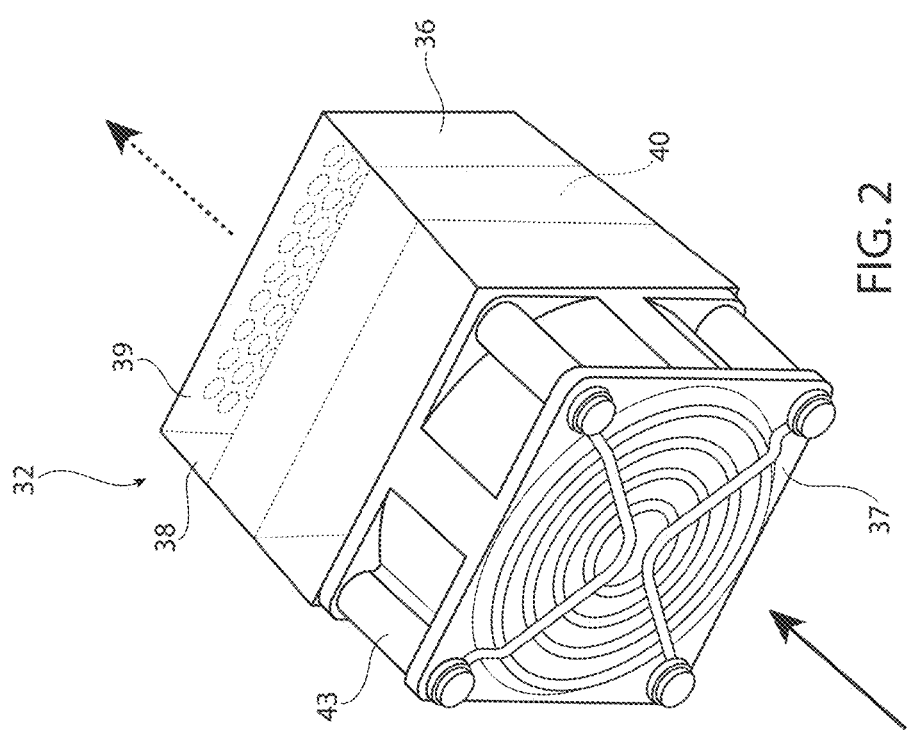
FIG. 2 is a perspective view, with parts removed for clarity, of a detail of the light fixture according to the present invention.

With reference to FIG. 2, each temperature control module 32 comprises a heating element 36 and a ventilating element 37.

The heating element 36 is configured to emit heat and comprises a casing 38, provided with at least a drilled (or at least partly drilled) wall 39, and a heater assembly 40 (schematically shown in FIG. 2) housed in the casing 38.

The heater assembly 40 can be produced using different technologies. For example, the heating element 36 can comprise a PTC heater assembly based on ceramic semiconductors in aluminium housings.

Alternatively, the heater assembly 40 can comprise plates made with heating cables or Joule effect resistive heating systems, wire-wound resistors, plate resistors, armoured resistors, etc.

The ventilating element 37 comprises at least a fan (not clearly visible in FIG. 2) housed in a housing body 43. The fan of the ventilating element 37 is configured to suck in and/or expel any air heated by the heating element 36.

The heating element 36 and the ventilating element 37 are arranged alongside each other. Preferably the heating element 36 and the ventilating element 37 are coupled to each other.

The heating element 36 and the ventilating element 37 of each temperature control module 32 can be independently controlled by the temperature control device 34.

The temperature control device 34 is therefore able to activate and regulate independently, for each temperature control module 32, the heating element 36 and the ventilating element 37.

In this way, as will be seen in detail further on, the temperature control modules 32 can be used not only in heating mode (i.e. with heating element 36 and ventilating element 37 active simultaneously), but also in cooling mode (i.e. with only the ventilating element 37 active and the heating element 36 not active).

The temperature control device 34 is configured to selectively regulate each temperature control module 32 on the basis of temperature values detected in the light fixture 1 by means of at least one temperature sensor 33.

In the non-limiting example described and illustrated here, the temperature control assembly comprises at least one temperature control module 32a housed in the yoke 6, at least one temperature control module 32b housed in the base 5 and at least one temperature control module 32c housed in the head 2.

Preferably, the temperature control assembly also comprises a further temperature control module 32d housed in the head 2 and a heater device 32e housed in the head 2 and preferably in the source assembly 24.

The temperature control module 32a is housed in the yoke 6 preferably in a junction portion between one of the arms 7 and the bridge portion 8 of the yoke 6.

More preferably, the temperature control module 32a is arranged in the junction between the arm 7 that does not house the motor 13 and the bridge portion 8 of the yoke 6.

The temperature control module 32b is arranged in the base 5.

The temperature control modules 32c and 32d are preferably arranged in the head 2 in substantially diametrically opposite positions so as to create, in use, a forced ventilation that follows a substantially circular ventilation path. Preferably, the temperature control modules 32c and 32d are arranged respectively in a portion proximal to the open end 21 of the head 2 and in a portion proximal to the source assembly 24 and, preferably, also to the fan 26.

In particular, the temperature control modules 32c and 32d are arranged in the head 2 in the portions just defined, but in areas proximal to the walls of the head 2 so as not to intercept the light beam generated by the source assembly 24 (said aspect is not clearly visible in the planar representation of FIG. 3).

The temperature control assembly further comprises at least one temperature sensor 33a housed in the yoke 6, at least one temperature sensor 33b housed in the base 5 and at least one temperature sensor 33c housed in the head 2.

Preferably, the temperature control assembly also comprises two further temperature sensors 33d 33e housed in the head 2.

The temperature sensor 33a is preferably arranged in the arm 7 in which the motor 13 is housed.

The temperature sensor 33b is housed in the base 5 near the electronic control module 19.

The temperature sensor 33c is arranged at the open end 21 of the head 2, preferably in a substantially median portion (i.e. on a median plane passing through the axis A), but preferably near the walls of the head 2 in order not to intercept the light beam generated by the source assembly 24.

The temperature sensor 33d is arranged at the closed end 20 of the head 2, near the source assembly 24 and ventilation path generated by the temperature control modules 32c and 32d.

The temperature sensor 33e is arranged in the source assembly 24.

The temperature sensors 33a 33b 33c 33d are preferably NTC probes. The temperature sensor 33e is preferably a thermocouple arranged in contact with a portion of the source assembly 24. For example, if the source assembly 24 comprises a laser source and at least one phosphor disc, the temperature sensor 33e is preferably arranged in contact with the motor responsible for the movement of the phosphor disc.

In use, the temperature control device 34 receives in input the data coming from at least one temperature sensor 33 (in the example described here from at least one of the temperature sensors 33a 33b 33c 33d 33e) and on the basis of said data, selectively regulates at least one temperature control module 32 (in the example described here at least one of the temperature control modules 32a 32b 32c 32d) and possibly the heater 32e.

Furthermore, the temperature control device 34 comprises a safety module 35, which sends a consent signal enabling the source assembly 24 and/or the electronic control module 19 on the basis of the temperatures detected by at least one of the temperature sensors 33b 33d 33e.

In particular, if the temperature detected by both the sensors 33*d* and 33*e* is higher than 0° C., the safety module 35 sends a consent signal enabling the source assembly 24 and/or if the temperature detected by the sensor 33*b* is higher than 0° C. the safety module 35 sends a consent signal enabling the electronic control module 19. Without the consent signal, the source assembly 24 and the electronic control module 19 cannot be used.

In other words, the source assembly 24 and the electronic control module 19 can be activated only when the temperature detected inside the head 2 and inside the base 5 is higher than 0° C.

In further detail, the temperature control device 34 is configured to monitor the temperature detected by the temperature sensors 33*a* 33*b* 33*c* 33*d* 33*e*.

If at least one of the temperature sensors 33*c*, 33*d* and 33*e* housed in the head 2 detects a temperature lower than 0° C., the temperature control device 34 activates the heating element 36 and the ventilating element 37 of the control modules 32*c*, 32*d* in the head 2 and, preferably, also activates the heater device 32*e*.

If at least one of the temperature sensors 33*c*, 33*d* and 33*e* detects a temperature higher than 5° C., the temperature control device 34 deactivates the heating element 36 of the control modules 32*d* and 32*c* and the heater device 32*e*, leaving active the ventilating element 37 of the control modules 32*d* and 32*c*.

If the temperature sensor 33*e* integrated in the source assembly 24 detects a temperature higher than 20° C., the fan 26 and any other ventilation systems provided in the head 2 are activated by the temperature control device 34.

If the temperature detected by the temperature sensor 33*c* is higher than 20° C., the heating element 36 of the control module 32*c* is deactivated, leaving only the ventilating element 37 active.

In this way, in the head 2 an optimal temperature is guaranteed for operation of the source assembly 24 and the components arranged inside the head 2 in all operating and external temperature conditions.

The temperature control device 34 is furthermore configured to activate the heating element 36 and the ventilating element 37 of the temperature control module 32*a* when the temperature value detected by the temperature sensor 33*a* in the yoke 6 is lower than 0° C.

The temperature in the yoke 6 is therefore kept at optimal levels for operation of the motor 13 and the components housed in the yoke 6 (e.g. transmissions, etc.).

Lastly, the temperature control device 34 is configured to activate the heating element 36 and the ventilating element 37 of the temperature control module 32*b* when the temperature value detected by the temperature sensor 33*b* in the base 5 is lower than 10° C. The heating element 36 of the temperature control module 32*b* is therefore maintained active until the temperature detected by the temperature sensor 33*b* in the base 5 reaches 20° C. When the temperature of 20° C. is reached, the ventilating element 37 of the temperature control module 32*b* is maintained active and the heating element 36 of the temperature control module 32*b* is switched off.

In this way the temperature in the base 5 is kept under control in all external temperature conditions.

Advantageously, the light fixture according to the present invention is able to maintain a controlled temperature in all ambient temperature conditions from −40° C. to +45° C.

Moreover, the presence of temperature control modules 32 having a ventilating element 37 and a heating element 36 that can be independently controlled means that different temperature conditions can be addressed. When the circulation of hot air is necessary, the temperature control modules 32 are used in heating and ventilation mode. When, on the other hand, it is sufficient to facilitate the air circulation without any need for heating, the temperature control modules 32 are used only in ventilation mode, helping to convey the air as required by the situation.

Substantially, the temperature control modules 32 are configured to generate a forced air circulation which can be selectively heated as required.

Lastly it is evident that modifications and variations can be made to the light fixture described here without departing from the scope of the attached claims.

The invention claimed is:

1. A light fixture comprising:
a head housing a source assembly configured to emit a light beam;
a support assembly configured to support the head;
a temperature control assembly configured to control the temperature inside the head and/or the support assembly; the temperature control assembly comprising:
at least one temperature control device;
at least one first temperature sensor; and
at least one first temperature control module housed in the head and/or in the support assembly and regulated by the temperature control device on the basis of data coming from the at least one first temperature sensor; the at least one first temperature control module being provided with a heating element and a ventilating element which are independently controllable by the temperature control device;
wherein the temperature control device is configured to activate the heating element and the ventilating element of the at least one first temperature control module when the temperature value detected by the at least one first temperature sensor is lower than a first threshold value and to deactivate the heating element while leaving the ventilating element active when the temperature value detected by the at least one first temperature sensor is higher than a second threshold value; the second threshold value being higher than the first threshold value;
wherein the temperature control assembly comprises two first control modules and at least one first temperature sensor housed in the head; the two first control modules being arranged in substantially diametrically opposite positions so as to create, in use, a forced ventilation following a substantially circular ventilation path.

2. The light fixture according to claim 1, wherein the first two temperature control modules are respectively arranged in a portion proximal to a projection opening of the head and in a portion proximal to the source assembly.

3. The light fixture according to claim 1, wherein the temperature control device is configured to activate the heating element and the ventilating element of the first temperature control modules when the temperature value detected by the at least one first temperature sensor housed in the head is lower than the first threshold value and to deactivate the heating element while leaving the ventilating element active when the temperature value detected by the at least one first temperature sensor in the head is higher than the second threshold value.

4. The light fixture according to claim 1, wherein the temperature control device comprises a safety module, which is configured to send a consent signal to enable the source assembly based on temperatures detected by the at least one first temperature sensor housed in the head.

5. The light fixture according to claim 1, wherein the support assembly is configured to move the head.

6. A light fixture comprising:
- a head housing a source assembly configured to emit a light beam;
- a support assembly configured to support the head;
- a temperature control assembly configured to control the temperature inside the head and/or the support assembly; the temperature control assembly comprising:
  - at least one temperature control device;
  - at least one first temperature sensor; and
  - at least one first temperature control module housed in the head and/or in the support assembly and regulated by the temperature control device on the basis of data coming from the at least one first temperature sensor; the at least one first temperature control module being provided with a heating element and a ventilating element which are independently controllable by the temperature control device;
- wherein the support assembly is configured to move the head;
- wherein the support assembly is configured to allow the head to rotate about a first axis and a second axis, orthogonal to the first axis; the support assembly comprising a base and a yoke; the yoke being coupled to the base in a manner rotatable about the first axis and supporting the head in a manner rotatable about the second axis.

7. The light fixture according to claim 6, wherein the temperature control assembly comprises at least a second temperature sensor and at least a second temperature control module both housed in the base.

8. The light fixture according to claim 6, wherein the temperature control assembly comprises at least a third temperature sensor and at least a third temperature control module both housed in the yoke.

9. The light fixture according to claim 8, wherein the yoke is provided with two arms, connected to the head, and a bridge portion connecting the two arms; the third control module being arranged in a junction portion between one of the arms and the bridge portion of the yoke.

* * * * *